A. M. THOMSON.
TURNING AND THREAD MILLING MACHINE.
APPLICATION FILED DEC. 26, 1916.
1,279,041.
Patented Sept. 17, 1918.
4 SHEETS—SHEET 1.
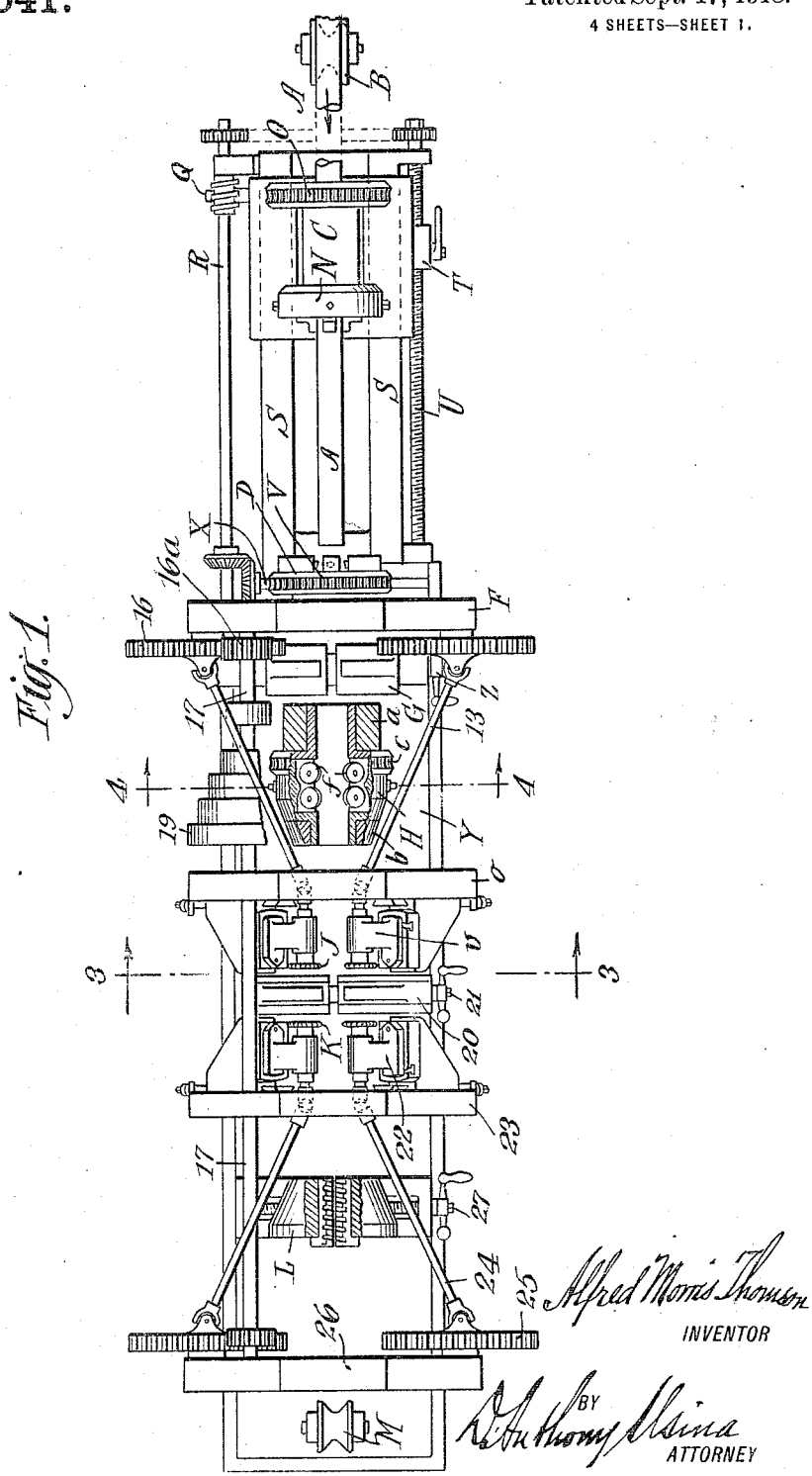

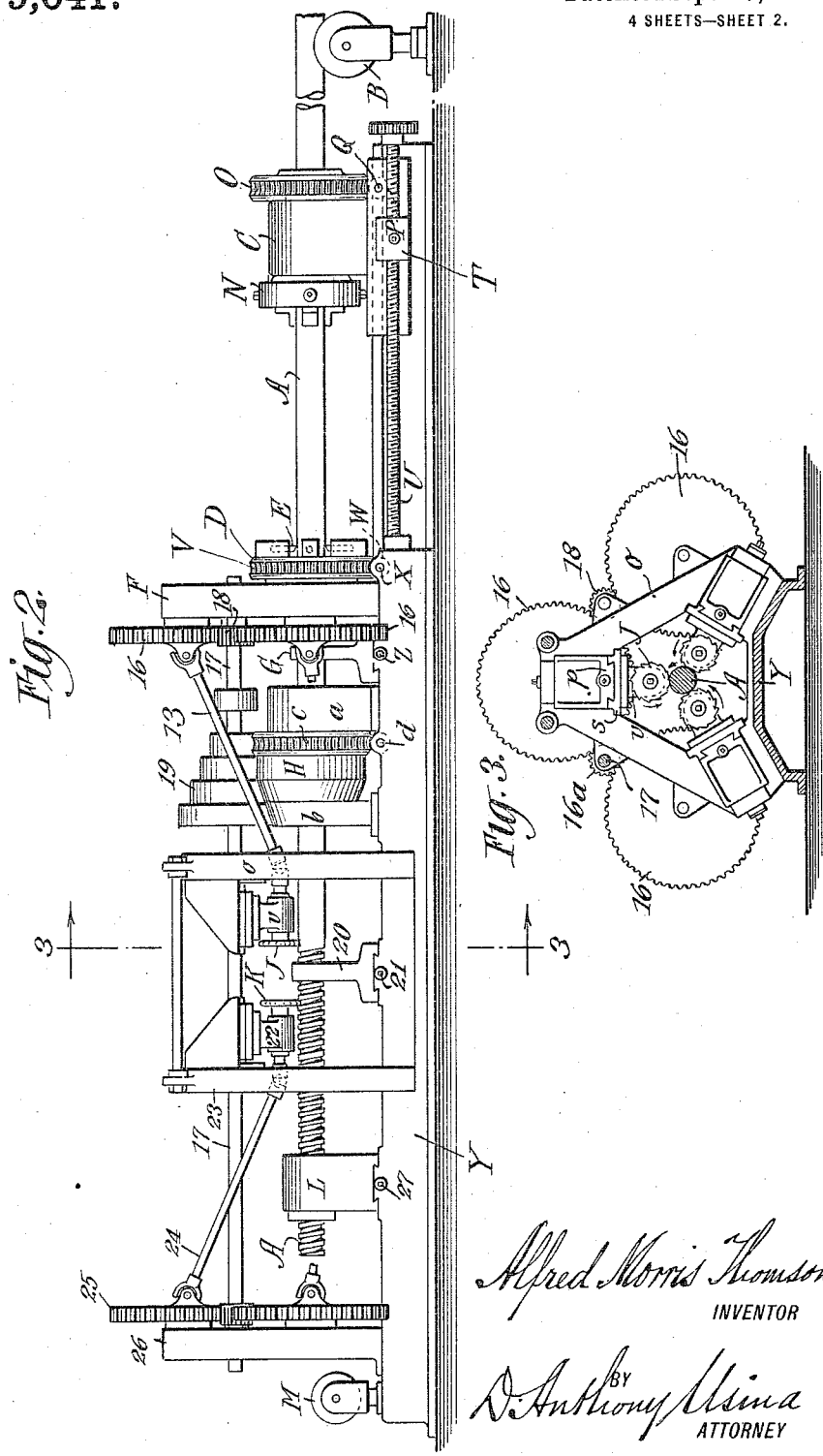

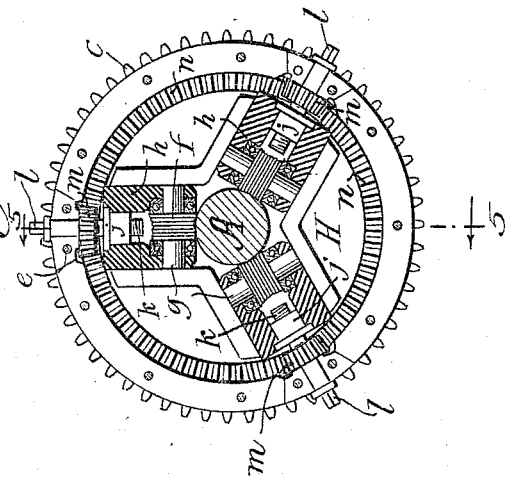
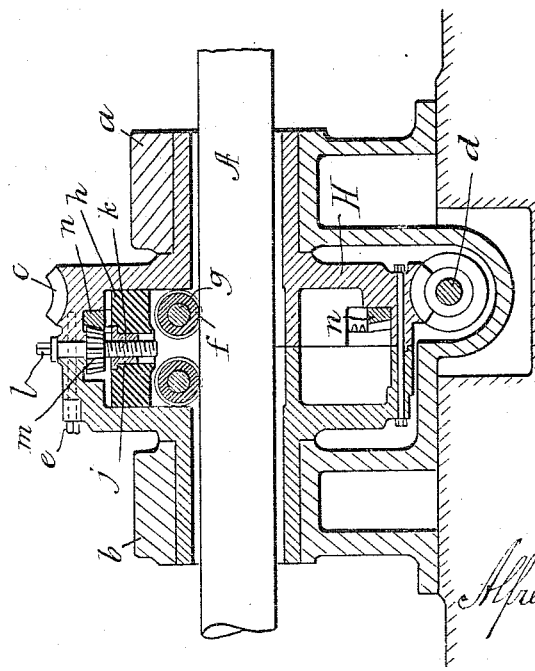

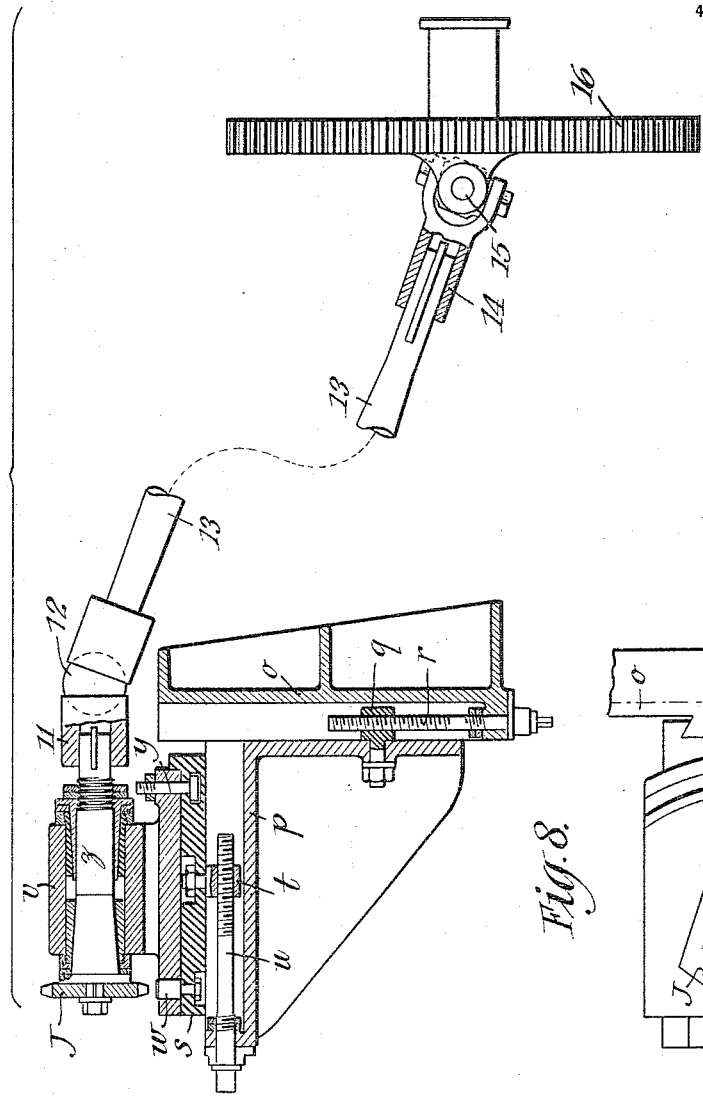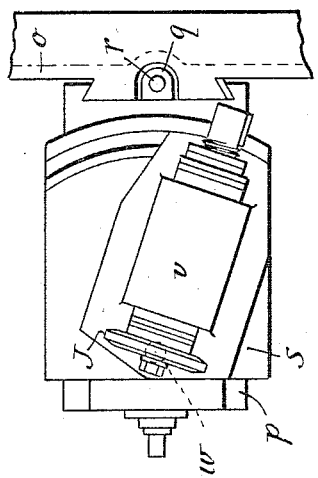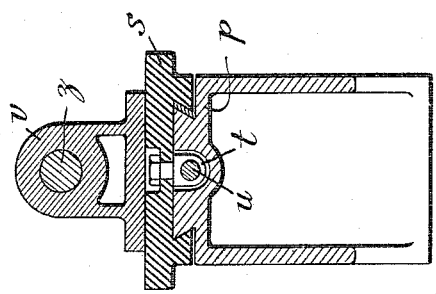

UNITED STATES PATENT OFFICE.

ALFRED MORRIS THOMSON, OF NEWARK, NEW JERSEY.

TURNING AND THREAD-MILLING MACHINE.

1,279,041.     Specification of Letters Patent.     Patented Sept. 17, 1918.

Application filed December 26, 1916. Serial No. 138,940.

*To all whom it may concern:*

Be it known that I, ALFRED MORRIS THOMSON, a subject of the King of Great Britain, residing in Newark, New Jersey, have invented certain new and useful Improvements in Turning and Thread-Milling Machines, of which the following is a specification.

My invention aims to provide a machine and method which is specially applicable to the producing of screw threaded rods of large diameter and great length, although the invention may be applied to other kinds of threading work.

The accompanying drawings illustrate one embodiment of the invention.

Figure 1 is a plan, largely in section, of a machine for taking bars of large size and great length and turning them and milling long threads thereon;

Fig. 2 is a side elevation of the same;

Fig. 3 is a section on the line 3—3 of Fig. 1;

Fig. 4 is a section approximately on the line 4—4 of Fig. 1;

Fig. 5 is a section on the line 5—5 of Fig. 4;

Fig. 6 is a partial plan and a partial section of one of the milling cutters and its driving connections;

Fig. 7 is a section of the same;

Fig. 8 is a plan view of the same;

In Fig. 1 the rod A is shown in starting position; and in Fig. 2 in final position.

Referring to the particular embodiment of the invention illustrated the workpiece A is a long bar or rod of large diameter which is to be turned with a lathe tool to an accurate cylinder and to be threaded throughout its length or for a considerable portion thereof. It runs over a supporting roller B and through a sliding chuck C, thence through a rotating turning head D which carries lathe tools or cutters E and which is mounted in a bearing block F, thence through an adjustable steady rest G and through a chuck H of special design which rotates the rod while permitting a free longitudinal feed thereof, thence through thread milling cutters J and K arranged in two sets, the first for roughing and the second for finishing; and finally the threaded end of the work passes through a feed nut formed of two half nuts L and over a supporting roller M.

The rod is fastened in the chuck C with its left hand or forward end projecting approximately to the lathe head D, with the chuck in its retracted position, at the right. The chuck is then fed slowly forward carrying the end of the rod through the lathe head and the steady rest G. The feeding chuck is then unclamped from the rod and shifted back to its starting position and again clamped on the rod and fed forward, carrying the end of the rod to the roughing thread cutters. The chuck C is again retracted, clamped on the rod and advanced, and this operation feeds the rod through the roughing and finishing thread cutters and into engagement with the lead nut L. Thereafter the chuck C is released and is no longer used on the same rod. After the end of the rod entered the rotating chuck H it was rotated thereby simultaneously with its forward feed by the chuck C, and a thread was cut by reason of this rotation. As soon therefore as the threaded end of the rod engaged the lead nut L, its continued rotation caused a corresponding feed and the original feeding chuck C could be thrown out of use.

The chuck C may be of any usual or suitable construction. As illustrated, the head N clamps directly on the work and is mounted on a large hollow spindle rotating in the body of the chuck and carrying at its rear end a worm gear O which is slowly rotated by a worm P (Fig. 2) on a cross shaft Q which is driven from a worm of ordinary type adapted to slide on a longitudinal shaft R driven as hereinafter described. The base of the chuck is mounted to slide on guides S and is provided at one side with a split nut T adapted to be engaged or disengaged from a feed screw U which is driven through suitable intermediate gearing at the rear end from the shaft R as indicated by dotted lines in Fig. 1. The gearing described is arranged to give a comparatively slow rotation and a comparatively fast feed. Of course, it will be designed in accordance with the pitch of the thread or threads to be cut. And the pitch will generally be greater for a triple thread (for which the illustrated machine is designed) than for a double or a single thread.

The turning head D is driven by means of a worm gear V in engagement with a worm W (Fig. 2) on a cross shaft X driven by bevel gears from the shaft R so as to secure a comparatively fast rotation and to make the proper fine turning cuts.

The steady rest G has jaws which form a bearing through which the shaft can pass and turn freely. It is of the usual style, arranged in two parts mounted to slide on the base Y as indicated in Fig. 3 and adjustable toward and from each other to embrace or release the work by means of a shaft Z having reversely threaded portions engaging the opposite halves of the bearing, the shaft being operated by hand by means of a crank on the end.

The chuck H is mounted in bearing blocks $a$ and $b$ set on the bed Y of the machine and carries a worm gear $c$ in engagement with a worm on a cross shaft $d$, Fig. 2, by which it is rotated at the same rate as the first feeding chuck C.

This chuck H, however, is held against longitudinal movement and is specially designed to permit the work to move longitudinally through it. The construction is illustrated in detail in Figs. 4 and 5. The casing of the chuck is divided transversely into two parts, united by bolts $e$, with a hollow space between them in which are located certain sharp edged rollers $f$ designed to grip the work A and to rotate the same as the chuck is rotated; and at the same time to guide the work and permit its longitudinal movement. The rollers $f$ are on shafts $g$ mounted in bearing blocks $h$ arranged to slide radially in the casing and each block $h$ carries fast in it a nut $j$ engaged by a screw $k$ having an outer squared end $l$ for turning it to any desired position of adjustment. The several screws $k$ carry pinions $m$ which engage a common annular gear $n$. By turning any one of the screws an identical movement is imparted to them all, and all the gripping rollers $f$ are identically adjusted inward or outward.

The thread milling cutters are shown in transverse planes for clearness. But they will be set at a slight angle to the work, corresponding to the pitch of the threads. To cut a single thread they would be located one in advance of another. But for cutting a triple thread, as illustrated, their centers will lie in a transverse plane, each being set at the angle of the threads. To secure the desired variations they are mounted to be adjustable, first, radially of the work for varying the depth of the cut; second, angularly according to the angle of the thread; and third, longitudinally of their axes according to the position of the thread or the space between successive threads.

There are three roughing milling cutters J arranged at equal distances around the work as indicated in Fig. 3, one immediately above and the other two at the side of and below the work. For clearness sake the upper cutter is omitted from Fig. 1 and the side cutter omitted from Fig. 2. The mounting of the cutters to permit the desired adjustments is indicated in Fig. 3 and, in more detail, in Figs. 6, 7 and 8. A triangular frame $o$ is fixed on the base Y of the machine and the cutters are mounted in carriages movable in radial grooves in this frame. The carriage $p$ is guided on a dovetailed guide (Fig. 8) on the frame $o$ so as to move in a radial direction and carries a nut $q$ through which passes a screw $r$ having a squared outer end by which it may be turned to adjust the carriage inward or outward. The carriage $p$, in turn, carries on a longitudinal guiding rib at the top a second carriage $s$ and the latter is provided with a nut $t$ through which passes a screw $u$ which can be turned by its squared outer end to adjust the carriage $s$ in a longitudinal direction. The bearing block $v$ through which the spindle of the cutter passes is mounted by a central pivot $w$ on the longitudinal adjustable carriage $s$. The carriage $s$ has an annular groove $x$ at its rear end in which travels a clamping bolt $y$. By loosening the latter the bearing can be swung about the pivot $w$ to the desired position of angular adjustment and then clamped in this position. The turning of the spindle $z$ of the cutter is effected by means of a jointed flexible shaft connected with a certain amount of longitudinal play to the spindle to permit the stated adjustments of the cutter. The shaft comprises a forward end piece 11 with a sliding key engagement with the spindle, a universal joint 12, an intermediate section 13 and a rear end piece 14 having a sliding connection with the section 13 and connected by a universal joint 15 with the hub of a gear 16. The gears 16 are mounted on the bearing block F. Two of them are driven by a pinion $16^a$ on a shaft 17 at one side of the machine and the third is operated synchronously with the other two by an intermediate pinion 18 on the other side of the machine. It is advisable to have the special chuck H which rotates the work as near to the cutters as possible. To secure this relation at the same time with a good drive for the milling cutters the flexible shafts diverge from the rear ends of the cutter spindles to the gears 16 which are in rear of the special chuck, the forward end of the latter even being tapered to get it closer to the cutters. The shaft 17 is the main shaft of the machine which is driven by cone pulleys 19 from a belt and not only operates the milling cutters as described but, by suitable intermediate gearing which is unnecessary to illustrate, drives the various other shafts and movable parts.

Between the roughing cutters J and the finishing cutters K there is a second steady rest 20 similar to that shown at G and supported on the base of the machine and adjusted by a threaded shaft 21 operated by a hand crank.

The finishing cutters K are mounted in bearing blocks 22 which are mounted in a fixed frame or bracket 23 and are adjustable identically as described for the bearing blocks v of the roughing cutters J. The spindles of the finishing cutters are also driven by shafts, indicated at 24, which are flexible and have provision for longitudinal play and are attached to the hubs of three gears 25 which are supported on a fixed bearing block 26 and are driven synchronously from the shaft 17 the same as in the case of the roughing cutters. The shafts indicated at 24 for driving the finishing cutters converge toward the latter, or rather diverge in the opposite direction, so as to leave room for placing the lead nut as close to the cutters as possible.

The lead nut L is in two identical halves, these being tapered as indicated to permit the nut to set within the cutter shafts 24 and as close to the cutters as possible. The two halves are mounted on a dove-tailed guide rib on the base of the machine and are adjusted toward and away from each other to clamp or to release the work by means of a transverse threaded shaft 27 operated by a hand crank at one end.

The engagement of the lead nut directly with a portion of the thread on the work presents a substantial advantage in the cutting of long threads on rods of large diameter, say for producing a threaded rod six or eight inches in diameter and from fifty to one hundred feet long as extreme cases. Large screws of considerable length have heretofore been made by piecing together shorter lengths, but it is almost impossible to secure a perfectly accurate continuation of the thread across the joints. Where a traveling chuck alone is used (or traveling cutters alone) to secure the feed a number of successive forward feeding movements (with intermediate returns to the starting position) must be made unless the machine be made of an inconvenient and perhaps impractical length; and at each successive step there is a break in the perfect continuity of the thread. My improved apparatus may be made comparatively short and compact and, therefore, more accurate than a machine of great length and at the same time will secure a thread of uninterrupted perfection on a rod of unlimited length. The first part of the thread, which is secured by means of a short feed, can be very perfectly made and the remainder of the thread will be absolutely continuous therewith and of the same perfection throughout its length. In this connection the advantage will be seen of arranging the feed nut which is to engage the finished thread of the work as close to the thread cutters as possible, so that the initial portion of the thread shall present the minimum variation from absolute perfection.

Similarly the thread cutters should be as close as possible to the special chuck for rotating the work in order to shorten the total distance to the feed nut and to hold the work up to the cutters with the least torsion. After the traveling chuck is out of use the rotation of the work is by means of this special chuck. The direction of the several drives is such that the turning tools tend to rotate the shaft in one direction and the milling cutters tend to rotate it in the opposite direction. The special rotating chuck, therefore, has a comparatively light load equal only to the force necessary to turn the work plus or minus the difference between these two opposing tendencies, depending on whether such difference is in the same direction as the rotation of the work or is in the opposite direction. That is, these opposing forces tend to rotate the work and the rotating chuck has only to accelerate or retard such rotation sufficiently to maintain the proper rate. Furthermore the resultant rotation produced by this chuck may be faster or slower within considerable limits since, whatever the rate of rotation, the feed nut will secure a proper relation between that and the longitudinal movement.

The present machine is advantageous, as compared with a machine of the full length of the thread, because of difficulties arising from heat-expansion. In the ordinary style of machine the heating of the rod after the cutting operation commences necessitates moving one of the lathe heads or centers back. As the cutter moves farther and farther away from the fixed end of the rod the thread becomes less and less accurate. In the present machine the fixed point is the feed nut, and this is very close to and always at the same distance from the thread cutters; so that the chance of error from expansion of the rod is reduced to a minimum.

The lathe or turning mechanism is not essential. Where a rod already turned to a true cylinder is to be threaded the turning tools may be omitted. Or for such work the machine may be built without the turning head. The turning head in the threading machine, however, is preferred. It forms the rod into a true cylinder whose axis is, by the same operation correctly alined for the threading operation. On a long rod the turning tools may become dull and require renewing before the end of the thread is cut. For such cases, in order to change tools without stopping the work, the turning head may be arranged for adjustment along ways S or the like; starting in a rear (to the right) position and holding its position normally, but adjustable forward so that the tools may be changed before the uncut portion of the rod again reaches them.

Other apparatus than that illustrated may be used for first forming a section of the thread on the end of the rod, using only the lead screw and thread cutters as illustrated, or others of equivalent type, either the special rotating chuck illustrated or some other means for rotating the work while permitting it to be advanced by reason of its engagement with the feed nut. For example, a separate short rod provided with the design of thread required may be joined to the end of the work and used, by its passage through the feed nut, to draw the work through the thread cutters and finally through the feed nut itself; so that the model thread will be duplicated on the end of the work and will then be continuously repeated along the length of the work.

In fact various modifications may be made in the design and arrangement of the separate parts of the apparatus and the various parts may be combined in a complete machine as illustrated or may be used separately or in various other combinations by those skilled in the art without departure from the invention which is defined in the following claims.

What I claim is—

1. A thread milling machine for milling threaded rods of great length including in combination radially and angularly adjustable rotary thread milling cutters a longitudinally-movable feeding means and a stationary feed nut adapted to engage a portion of the thread.

2. A thread milling machine for milling threaded rods of great length including in combination longitudinally-movable means for giving the work an initial advance and a lead nut adapted to engage a finished portion of the thread and give the work a further advance.

3. A machine for making threaded rods including in combination a rotary lathe head tending to rotate the work in one direction, thread milling cutters tending to rotate the work in the opposite direction and a rotating chuck for rotating the work at the desired rate.

4. A machine for making threaded rods including in combination a rotary lathe head tending to rotate the work in one direction, thread milling cutters tending to rotate the work in the opposite direction and a rotating chuck for rotating the work at the desired rate and a stationary lead nut engaging the finished thread to feed the work in proportion to its rate of rotation.

5. A thread milling machine for milling threaded rods of great length including in combination a longitudinally movable feeding means to initially rotate and feed the work and a stationary feed nut arranged to engage the finished portion of the thread, and subsequently feed the work in proportion to its rate of rotation.

6. A thread milling machine for milling threaded rods of great length including in combination a feed nut formed of two half-nuts L, a radially and angularly adjustable rotary thread milling cutter, and an adjustable chuck H which rotates the work while permitting longitudinal movement thereof.

7. A thread milling machine for milling threaded rods of great length including in combination a feed nut formed of two half-nuts L, a thread milling cutter, a chuck H which rotates the work while permitting longitudinal movement thereof and a sliding chuck C.

8. A thread milling machine for milling threaded rods of great length including in combination a feed nut formed of two half-nuts L, a chuck H, two sets of thread milling cutters located between said feed nut and said chuck, and driving means for said cutters comprising shafts extending from one set to the rear of said chuck and from the other set beyond said feed nut.

9. A thread milling machine for milling threaded rods of great length including in combination a feed nut formed of two half-nuts L, a thread milling cutter, a chuck H which rotates the work while permitting longitudinal movement thereof, a sliding chuck C and a rotating lathe head between the chuck C and the chuck H.

10. A thread milling machine including means for advancing the work in an axial direction, a rotating chuck having a plurality of radially adjustable disks therein with axes located in a transverse plane adapted to engage the work and rotate it with the chuck while permitting it to advance longitudinally through the chuck and means for simultaneously adjusting said disks.

11. A chuck for threading machines comprising a plurality of means for gripping the work, said gripping means being rotatable about an axis in a plane transverse to the axis of the work, means for simultaneously adjusting said plurality of gripping means, and means for rotating said gripping means and the work about the axis of the work.

12. A thread milling machine including in combination a milling cutter mounted for angular adjustment on a base which is adjustable toward and away from the work, means for rotating the work while permitting the longitudinal movement thereof and separate means for advancing the work.

In witness whereof, I have hereunto signed my name.

ALFRED MORRIS THOMSON.

Copies of this patent may be obtained for five cents each, by addressing the "Commissioner of Patents, Washington, D. C."